(12) United States Patent
Park et al.

(10) Patent No.: US 10,545,265 B2
(45) Date of Patent: Jan. 28, 2020

(54) FUNCTIONAL ANTIREFLECTION FILM

(71) Applicant: LG Chem, Ltd., Seoul (KR)

(72) Inventors: Se-Jung Park, Gyeonggi-do (KR); Hong-Kwan Cho, Gyeonggi-do (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 6 days.

(21) Appl. No.: 15/516,785

(22) PCT Filed: Oct. 8, 2015

(86) PCT No.: PCT/KR2015/010669
§ 371 (c)(1),
(2) Date: Apr. 4, 2017

(87) PCT Pub. No.: WO2016/056861
PCT Pub. Date: Apr. 14, 2016

(65) Prior Publication Data
US 2017/0307784 A1    Oct. 26, 2017

(30) Foreign Application Priority Data

Oct. 10, 2014  (KR) .......................... 10-2014-0136693

(51) Int. Cl.
*G02B 1/118* (2015.01)
*C08J 7/04* (2006.01)
(Continued)

(52) U.S. Cl.
CPC .............. *G02B 1/118* (2013.01); *C08J 7/047* (2013.01); *C09D 5/006* (2013.01); *C09D 7/20* (2018.01);
(Continued)

(58) Field of Classification Search
CPC .. G02B 1/11; G02B 1/118; G02B 1/04; G02B 1/12; G02B 27/0025; G02B 1/108;
(Continued)

(56) References Cited

U.S. PATENT DOCUMENTS 3,301,741 A * 1/1967 Danielson .................. C09J 7/20
428/41.5
6,210,858 B1    4/2001 Yasuda et al.
(Continued)

FOREIGN PATENT DOCUMENTS

CN    101504467 A    8/2009
JP    2009014917 A    1/2009
(Continued)

OTHER PUBLICATIONS

Chandrasekaran, Table of Solvent Physical Properties, https://people.chem.umass.edu/xray/solvent.html, archived 2012.*
(Continued)

*Primary Examiner* — George G King
(74) *Attorney, Agent, or Firm* — Lerner, David, Littenberg, Krumholz & Mentlik, LLP

(57) ABSTRACT

Provided is an antireflection film including: a substrate layer; and a coating layer formed on at least one surface of the substrate layer, in which the coating layer includes a cured material of a composition containing a photo-curable (meth)acrylic acid ester resin; inorganic nanoparticles; a silicone-acrylate graft polymer including a polyacrylate main chain and a silicone side chain; and a solvent.

19 Claims, 1 Drawing Sheet

(51) Int. Cl.
   *G02B 1/04*      (2006.01)
   *C09D 151/08*   (2006.01)
   *C09D 7/00*      (2018.01)
   *C09D 5/00*      (2006.01)
   *G02B 1/12*      (2006.01)
   *G02B 27/00*     (2006.01)
   *C08K 3/36*      (2006.01)
   *C08K 9/06*      (2006.01)
   *G02B 1/11*      (2015.01)
   *C09D 7/20*      (2018.01)
   *C09D 7/40*      (2018.01)
   *C09D 7/62*      (2018.01)
   *C08K 3/22*      (2006.01)

(52) U.S. Cl.
   CPC .................. *C09D 7/62* (2018.01); *C09D 7/67* (2018.01); *C09D 151/08* (2013.01); *C09D 151/085* (2013.01); *G02B 1/04* (2013.01); *G02B 1/11* (2013.01); *G02B 1/12* (2013.01); *G02B 27/0018* (2013.01); *G02B 27/0025* (2013.01); *C08J 2367/02* (2013.01); *C08J 2451/08* (2013.01); *C08K 3/36* (2013.01); *C08K 9/06* (2013.01); *C08K 2003/2241* (2013.01); *C08K 2003/2244* (2013.01); *C08K 2201/003* (2013.01); *C08K 2201/011* (2013.01)

(58) Field of Classification Search
   CPC .. G02B 1/111; C09D 7/20; C09D 7/67; C09D 7/62; C09D 5/006; C09D 7/001; C09D 7/1225; C09D 7/1266; C09D 151/08; C09D 151/085; C08J 7/047; C08J 2367/02; C08J 2451/08; C08K 3/36; C08K 9/06; C08K 2201/003
   See application file for complete search history.

(56) References Cited

U.S. PATENT DOCUMENTS

| | | | |
|---|---|---|---|
| 2003/0111159 A1* | 6/2003 | Hashimoto | B32B 17/10018 156/99 |
| 2013/0040073 A1* | 2/2013 | Pett | C08J 7/123 427/596 |
| 2013/0084442 A1* | 4/2013 | Akutagawa | C09D 127/20 428/212 |
| 2016/0091635 A1* | 3/2016 | Ibuki | G02B 1/118 15/209.1 |

FOREIGN PATENT DOCUMENTS

| | | |
|---|---|---|
| JP | 2009051045 A | 3/2009 |
| JP | WO2007074693 A1 | 6/2009 |
| KR | 20060030848 A | 4/2006 |
| KR | 20070078893 A | 8/2007 |
| KR | 20080078801 A | 8/2008 |
| KR | 20120077917 A | 7/2012 |
| WO | 2007074693 A1 | 7/2007 |

OTHER PUBLICATIONS

International Search Report from PCT/KR2015/010669, dated Jan. 14, 2016.
Chinese Search Report for Application No. CN201580054666.8 dated May 29, 2019.

* cited by examiner

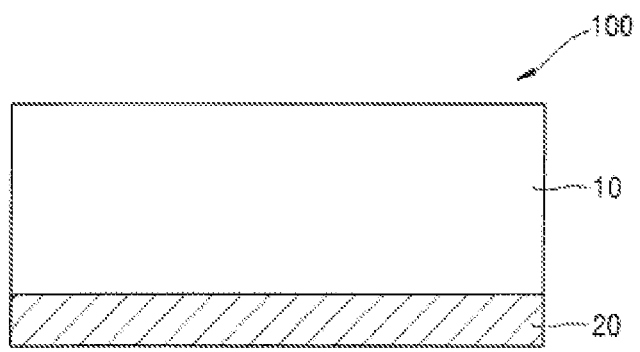

FUNCTIONAL ANTIREFLECTION FILM

CROSS-REFERENCE TO RELATED APPLICATIONS

The present application is a national phase entry under 35 U.S.C. § 371 of International Application No. PCT/KR2015/010669 filed Oct. 8, 2015, published in Korean, which claims priority from Korean Application No. 10-2014-0136693 filed on Oct. 10, 2014, all of which are incorporated herein by reference.

TECHNICAL FIELD

The present invention relates to a functional antireflection film.

BACKGROUND ART

When a display is exposed to various illuminations and natural light, and the like, the deterioration in contrast, which is caused by the failure to clearly form images created by reflected light inside the display on the eyes, makes it difficult for a user to see screen, and causes fatigue to the eyes or causes a headache. For this reason, the need for antireflection also becomes very strong. Further, in order to improve the visibility of a display, researches and developments have been conducted on various functionalities to reduce the moire phenomenon or the Newton's ring phenomenon in addition to the antireflection function. However, it is still difficult to design an antireflection film for securing antireflection and various functionalities without hindering optical properties such as light transmittance.

DETAILED DESCRIPTION OF THE INVENTION

Technical Problem

An exemplary embodiment of the present invention provides an antireflection film which simultaneously implements excellent antireflection function and Newton's ring prevention function without hindering the optical properties thereof.

Technical Solution

An exemplary embodiment of the present invention provides an antireflection film including: a substrate layer; and a coating layer formed on at least one surface of the substrate layer, in which the coating layer includes a cured material of a composition containing a photo-curable (meth)acrylic acid ester resin; inorganic nanoparticles; a silicone-acrylate graft polymer including a polyacrylate main chain and a silicone side chain; and a solvent.

The silicone-acrylate graft polymer may have a weight average molecular weight (Mw) of about 1,000 to about 2,500.

The silicone-acrylate graft polymer may include the silicone side chain in an amount of about 10 wt % to about 30 wt %.

The silicone side chain of the silicone-acrylate graft polymer may be exposed to a surface of the coating layer.

The solvent may have a polarity index of 5.0 or less.

The solvent may include at least one selected from the group consisting of a benzene solvent, a ketone solvent, an alcohol solvent, and a combination thereof.

The photo-curable (meth)acrylic acid ester resin may have a weight average molecular weight (Mw) of about 150 to about 300.

The inorganic nanoparticles may have an average particle diameter of about 30 nm to about 60 nm.

The inorganic nanoparticles may include at least one selected from the group consisting of silica particles, titania particles, zirconium oxide particles, and a combination thereof.

The inorganic nanoparticles may be surface-treated with a silane-based compound.

About 10% to about 50% of the total surface area of the inorganic nanoparticles may be surface-treated with the silane-based compound.

The silane-based compound may include at least one selected from the group consisting of 3-aminopropyltriethoxysilane (AOPTMS), methacryloxypropyltrimethoxysilane (MAPTMS), 3-methacryloxypropyltrimethoxysilane, and a combination thereof.

The composition may include the silicone-acrylate graft polymer in an amount of about 0.03 wt % to about 0.1 wt %.

The composition may include the solvent in an amount of about 50 wt % to about 90 wt %.

The cured material may be formed by photo-curing the composition at a light energy of about 200 mJ to about 400 mJ.

The substrate layer may include at least one selected from the group consisting of polyethylene terephthalate (PET), polyethylene naphthalate (PEN), polyether sulfone (PES), polycarbonate (PC), polypropylene (PP), and a combination thereof.

The substrate layer may have a thickness of about 25 μm to about 200 μm.

The coating layer may have a thickness of about 90 nm to about 120 nm.

The antireflection film may further include an adhesive layer and a release film layer on one surface of the substrate layer.

Advantageous Effects

The antireflection film may be applied to a display, and the like to implement the Newton's ring prevention function while securing excellent optical properties and antireflection function.

BRIEF DESCRIPTION OF DRAWINGS

FIG. 1 schematically illustrates the cross-section of an antireflection film according to an exemplary embodiment of the present invention.

BEST MODE

The benefits and features of the present invention and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims. Throughout the specification, like reference numerals indicate like constituent elements.

An exemplary embodiment of the present invention provides an antireflection film including: a substrate layer; and a coating layer formed on at least one surface of the substrate layer, in which the coating layer includes a cured material of a composition containing a photo-curable (meth)acrylic acid ester resin; inorganic nanoparticles; a silicone-acrylate graft polymer including a polyacrylate main chain and a silicone side chain; and a solvent.

In general, an antireflection film serves to prevent light incident to a touch screen panel such as a display from being reflected and making the visibility deteriorate, and has a structure in which a coating layer having an antireflection function is laminated on a substrate layer.

Meanwhile, when a display is touched, two different bases present therein are brought into contact with each other, and as a result, a rainbow-colored ring called as a Newton's ring may be generated by the interference of light resulting from the pressing of air layer, and the Newton's ring is responsible for hindering visibility. A separate film for preventing the Newton's ring may be manufactured. However, since the separate film for preventing the Newton's ring needs to be structurally present at a position which is the same as that of an antireflection film inside the display, there is a problem in that the two films are used together, and cannot be simultaneously exposed to the surface of the display.

Accordingly, the antireflection film according to the present invention may solve the problem and secure excellent functionality by including a single coating layer which simultaneously implements an antireflection function and a Newton's ring prevention function.

FIG. 1 schematically illustrates the cross-section of an antireflection film 100 according to an exemplary embodiment of the present invention. Referring to FIG. 1, the antireflection film 100 includes a substrate layer 10 and a coating layer 20 formed on at least one surface of the substrate layer 10.

The coating layer 20 serves to simultaneously implement an antireflection function and a Newton's ring prevention function, and specifically, the coating layer 20 may be formed from a composition including a photo-curable (meth)acrylic acid ester resin; inorganic nanoparticles; a silicone-acrylate graft polymer having a silicone side chain grafted to a polyacrylate main chain; and a solvent, and more specifically, the coating layer 20 may include a cured material of the composition.

The silicone-acrylate graft polymer has a silicone side chain grafted to a polyacrylate main chain, and serves to improve a Newton's ring prevention function. Further, the coating layer includes a cured material of the composition, but the silicone-acrylate graft polymer serves as an additive which maintains the form thereof without being reacted even during the process in which the composition is cured.

Specifically, the silicone-acrylate graft polymer may have a weight average molecular weight of about 1,000 to about 2,500. The silicone-acrylate graft polymer may have a weight average molecular weight within the range, thereby implementing an excellent Newton's ring prevention function without being chemically reacted with other components of the composition.

Further, the silicone-acrylate graft polymer may include the silicone side chain in an amount of about 10 wt % to about 30 wt %, for example, about 20 wt % to about 30 wt %. The silicone-acrylate graft polymer may include the silicone side chain in a content within the range and thus be interacted with the solvent, thereby imparting a slip property to the surface of the coating layer and securing an excellent Newton's ring prevention function. When the silicone-acrylate graft polymer includes the silicone side chain in an amount of less than about 10 wt %, it may be difficult to impart a slip property to the surface of the coating layer so as to implement the Newton's ring prevention function.

The silicone side chain of the silicone-acrylate graft polymer may be exposed to the surface of the coating layer, and as a result, it is possible to impart a slip property so as to obtain an excellent Newton's ring prevention function. Specifically, the degree, to which the silicone-acrylate graft polymer is exposed to the surface, may be adjusted depending on the degree of the polarity of the solvent.

Specifically, the solvent may have a polarity index of 5.0 or less. The 'polarity index' generally indicates the degree of polarity of the solvent, and the polarity from non-polarity is quantified from 0 to 10. The polarity index of the solvent satisfies the range, such that the degree to which the silicone-acrylate graft polymer is exposed to the surface of the coating layer is adjusted, thereby securing an excellent slip property and maximizing the Newton's ring prevention function.

The solvent may include an alkane solvent such as pentane, 1,1,2-trichlorotrifluoroethane, cyclopentane, heptane, hexane, iso-octane, cycichexane, and dichloromethane; an ether solvent such as tetrahydrofuran and 1,4-dioxane; a benzene solvent such as toluene, xylene, chlorobenzene, and dichlorobenzene; a ketone solvent such as methyl ethyl ketone, methyl butyl ketone, methyl isobutyl ketone, diethyl ketone, dipropyl ketone, and cyclohexanone; and an alcohol solvent such as methanol, ethanol, isopropanol, and butanol.

Specifically, the solvent may include at least one selected from the group consisting of a benzene solvent, a ketone solvent, an alcohol solvent, and a combination thereof, and in this case, the silicone-acrylate graft polymer is easily exposed to the surface of the coating layer, and the Newton's ring prevention function may be effectively improved.

More specifically, the solvent is a mixture of a benzene solvent, a ketone solvent, and an alcohol solvent, the mixture may have a polarity index of 5.0 or less, and in this case, an excellent Newton's ring prevention function may be implemented.

The antireflection film may include a photo-curable (meth)acrylic acid ester resin in order to implement excellent optical properties, and specifically, the photo-curable (meth)acrylic acid ester resin may be in the form of an oligomer.

More specifically, the photo-curable (meth)acrylic acid ester resin may have a weight average molecular weight of about 150 to about 300. The photo-curable (meth)acrylic acid ester resin has a weight average molecular weight within the range, and thus may facilitate the photo-curing of the composition comprising inorganic nanoparticles and may implement a coating layer having an appropriate curing degree.

The photo-curable (meth)acrylic acid ester resin may include at least one selected from the group consisting of a polyhydric alcohol; a polyhydric carboxylic acid and an anhydride thereof; and polyester(meth)acrylate which can be obtained by esterifying acrylic acid, polysiloxane polyacrylate, polyurethane (meth)acrylate, polyol poly(meth)acrylate, and a combination thereof, but is not limited thereto.

The composition for forming the coating layer may further a crosslinkable monomer in order to secure a suitable crosslinking density of the photo-curable (meth)acrylic acid ester resin, and may include the crosslinkable monomer in a suitable content, if necessary.

The crosslinkable monomer may include at least one selected from the group consisting of ethylene glycol diacrylate, neopentyl glycol di(meth)acrylate, 1,6-hexanediol di(meth)acrylate, trimethylolpropane tri(meth)acrylate, pentaerythritol hexa(meth)acrylate, di(meth)acrylate of bisphenol A-diglycidyl ether, urethane(meth)acrylate, pentaerythritol tetra(meth)acrylate, glycerin tri(meth)acrylate, and a combination thereof, but is not limited thereto.

The composition for forming the coating layer serves to improve dispersibility and transparency, and may include inorganic nanoparticles. The inorganic nanoparticles may include at least one selected from the group consisting of silica particles, titania particles, zirconium oxide particles, and a combination thereof.

The inorganic nanoparticles may have an average particle diameter of about 30 nm to about 60 nm. When the average particle diameter of the inorganic nanoparticles satisfies the range, the composition is easily coated to have a thickness suitable to cause light interference, and accordingly, the reflectance may be minimized, and a coating layer formed of the composition may secure an appropriate particle density, thereby exhibiting excellent mechanical properties.

The inorganic nanoparticles may be surface-treated with a silane-based compound. The inorganic nanoparticles may be chemically bonded to the photo-curable (meth)acrylic acid ester resin via the surface treatment, and may implement excellent dispersibility and durability.

Specifically, about 10% to about 50% of the surface area of the particles of the inorganic nanoparticles may be surface-treated with a silane-based compound, and in this case, the composition may implement a coating layer having a uniform dispersibility and an excellent transparency. Specifically, the silane-based compound may include at least one selected from the group consisting of 3-aminopropyltriethoxysilane (AOPTMS), methacryloxypropyltrimethoxysilane (MAPTMS), 3-methacryloxypropyltrimethoxysilane, and a combination thereof. The inorganic nanoparticles may be surface-treated with the silane-based compound, thereby implementing excellent dispersibility and durability and improving optical properties such as transparency.

The composition includes the silicone-acrylate graft polymer as an additive for securing the Newton's ring prevention function, and specifically, may include the silicone-acrylate graft polymer in an amount of about 0.03 wt % to about 0.1 wt %. The silicone-acrylate graft polymer may be included in a content within the range, thereby securing an excellent Newton's ring prevention function without hindering the antireflection function. When the silicone-acrylate graft polymer is included in an amount of less than about 0.03 wt %, it is difficult to implement the Newton's ring prevention function, and when the silicone-acrylate graft polymer is included in an amount of more than about 0.1 wt %, there may be concern in that the silicone-acrylate graft polymer remains therein after the coating layer is manufactured, and the bonding force of components constituting the coating layer may be reduced.

Further, the composition may include the solvent in an amount of about 50 wt % to about 90 wt %. The composition includes the solvent in a content within the range, and as a result, it is advantageous to expose the silicone-acrylate graft polymer to the surface of the coating layer, and the Newton's prevention function may be effectively improved.

In addition, the composition may include the photo-curable (meth)acrylic acid ester resin in an amount of about 1 wt % to about 5 wt %. Further, the composition may include the inorganic nanoparticles in an amount of about 5 wt % to about 45 wt %. The resin and the inorganic nanoparticles are included in a content within the range, thereby implementing excellent optical properties while improving the antireflection function and the Newton's ring prevention function.

The composition can be photo-cured, and may further include a photoinitiator. When the composition further includes a photoinitiator, the content thereof may be about 0.5 wt % to about 1 wt %.

The type of photoinitiator is not particularly limited, but the photoinitiator may include at least one selected from the group consisting of, for example, an α-hydroxy ketone compound, a phenylglyoxylate compound, a benzyldimethylketal compound, an α-aminoketone compound, a monoacylphosphine (MAPO) compound, a bisacylphosphine (BAPO) compound, a phosphine oxide compound, a metalocene compound, an iodonium salt, and a combination thereof.

The coating layer may include a cured material of the composition, and specifically, may include a photo-cured material of the composition. In this case, the cured material may be formed by photo-curing the composition at a light energy of about 200 mJ to about 400 mJ. The composition may be cured at a light energy within the range, thereby securing an appropriate curing degree for exhibiting excellent optical properties while improving the antireflection function and the Newton's ring prevention function.

Referring to FIG. 1, the antireflection film 100 includes a substrate layer 10, and the coating layer 20 may be formed on one surface of the substrate layer 10.

The substrate layer is a transparent film, and may include at least one material selected from the group consisting of polyethylene terephthalate (PET), polyethylene naphthalate (PEN), polyether sulfone (PES), polycarbonate (PC), polypropylene (PP), and a combination thereof. For example, the substrate layer 10 may include polyethylene terephthalate (PET), and in this case, the bonding force to the coating layer is excellent, and as a result, it is possible to obtain an effect of enhancing mechanical properties.

The substrate layer 10 may have a thickness of about 25 μm to about 200 μm. The substrate layer 10 has a thickness within the range, and as a result, may serve as a support for securing excellent durability without making transparency deteriorate.

The coating layer may have a thickness of about 90 μm to about 120 μm. The coating layer 20 has a thickness within the range, and may simultaneously implement excellent antireflection function and Newton's ring prevention function without hindering optical properties.

The antireflection film may further include an adhesive layer and a release film layer on one surface of the substrate layer, and specifically, may have a structure in which a release film layer, an adhesive layer, a substrate layer, and a coating layer are sequentially laminated. In this case, the antireflection film is easily distributed and is easily attached to a body to be attached after a release film is simply removed, and accordingly, may secure convenience in being applied to a display device, and the like.

When the antireflection film further includes an adhesive layer on one surface of the substrate layer, the adhesive layer may be formed of a transparent adhesive, and for example, the adhesive may include one or more selected from the group consisting of an acrylic adhesive, a rubber adhesive, a silicone adhesive, and a combination thereof.

The antireflection film exhibits excellent optical properties while simultaneously securing an antireflection function and a Newton's ring prevention function, and specifically, the reflectance is about 5% or less, for example, about 1.1% or less, and for example, about 1% or less. The 'reflectance' is a measurement of a ratio of light reflected without being transmitted by irradiating the antireflection film with light, and it can be seen that the reflectance satisfies the range, and accordingly, an excellent antireflection function is secured.

Further, the antireflection film may have a light transmittance of about 90% or more, for example, about 95% or more. The antireflection film has a light transmittance within the range, and thus may simultaneously implement excellent optical properties and an antireflection function.

Hereinafter, specific examples of the present invention will be suggested. However, the Examples described below are only provided for specifically exemplifying or explaining the present invention, and the present invention is not limited thereby.

EXAMPLES AND COMPARATIVE EXAMPLES

Example 1

10 wt % of silica particles in which 18% of the total surface area was surface-treated with 3-aminopropyltriethoxysilane (AOPTMS), 1 wt % of a photo-curable acrylate resin being a mixture of polysiloxane polyacrylate and polyurethane (meth)acrylate, and 0.94 wt % of a photoinitiator (manufactured by Ciba Co., Ltd., Irgacure-184) were mixed, 88 wt % of a solvent having a polarity index of 1.8 and being a mixture of a ketone solvent, a benzene solvent, and an alcohol solvent was mixed therewith, and 0.06 wt % of a silicone-acrylate graft polymer was added thereto, thereby manufacturing a composition for a coating layer. Meanwhile, a polyethylene terephthalate (PET) substrate layer having a thickness of 50 μm was prepared, and the composition for a coating layer was coated on one surface of the substrate layer, and then was cured at a light energy of 300 mJ to manufacture a coating layer having a thickness of 100 nm, thereby manufacturing an antireflection film.

Example 2

An antireflection film was manufactured in the same manner as in Example 1, except that a solvent having a polarizing index of 7.3 and being a mixture of a ketone solvent, a benzene solvent, and an alcohol solvent was used.

Comparative Example 1

10.055 wt % of silica particles in which 18% of the total surface area was surface-treated with 3-aminopropyltriethoxysilane (AOPTMS), 1.005 wt % of a photo-curable acrylate resin being a mixture (or a copolymer) of polysiloxane polyacrylate and urethane (meth)acrylate, and 0.94 wt % of a photoinitiator (manufactured by Ciba Co., Ltd., Irgacure-184) were mixed, and 88 wt % of a solvent having a polarity index of 1.8 and being a mixture of a ketone solvent, a benzene solvent, and an alcohol solvent was mixed therewith, thereby manufacturing a composition for a coating layer. Meanwhile, a polyethylene terephthalate (PET) substrate layer having a thickness of 50 μm was prepared, and the composition for a coating layer was coated on one surface of the substrate layer, and then was cured at a light energy of 300 mJ to manufacture a coating layer having a thickness of 100 nm, thereby manufacturing an antireflection film.

TABLE 1

| Classification | Inorganic nanoparticles | Photocurable resin | Silicone-acrylate graft polymer | Photoinitiator | Solvent Content | Polarity index |
|---|---|---|---|---|---|---|
| Example 1 | 10 | 1 | 0.06 | 0.94 | 88 | 1.8 |
| Example 2 | 10 | 1 | 0.06 | 0.94 | 88 | 7.3 |
| Comparative Example 1 | 10.055 | 1.005 | 0 | 0.94 | 88 | 1.8 |

Table 1 shows the content of each component included in the compositions for a coating layer in the Examples and the Comparative Example by wt %.

Evaluation

Experimental Example 1: Measurement of Reflectance

For the antireflection films in the Examples and the Comparative Example, samples with a size of width× length=50 mm×50 mm were manufactured, the reflectance was measured by using a transmission reflectance measurement device (KONICA MINOLTA, Spectrophotometer CM-5), and the results are shown in the following Table 2.

Experimental Example 2: Measurement of Light Transmittance

For the antireflection films in the Examples and the Comparative Example, samples with a size of width× length=50 mm×50 mm were manufactured, the light transmittance was measured by using a transmission reflectance measurement device (KONICA MINOLTA, Spectrophotometer CM-5), and the results are shown in the following Table 2.

Experimental Example 3: Measurement of Newton's Ring Prevention Function

For the antireflection films in the Examples and the Comparative Example, samples with a size of width× length=80 mm×120 mm were manufactured, the time taken for removing a Newton's ring produced after the sample was pressurized on a polarizing film was measured via an evaluation made by the unaided eye, and the results are shown in the following Table 2.

TABLE 2

| Classification | Reflectance [%] | Light transmittance [%] | Newton's ring prevention function |
|---|---|---|---|
| Example 1 | 0.98 | 95.25 | 2 sec |
| Example 2 | 1.09 | 95.3 | 15 sec |
| Comparative Example 1 | 1.17 | 95.35 | Not removed |

Referring to the results of Table 2, it can be seen that the antireflection films in Examples 1 and 2 simultaneously implement excellent antireflection function, optical properties, and Newton's ring prevention function, whereas Comparative Example 1 does not include a silicone-acrylate graft polymer as an additive, and fails to implement the Newton's ring prevention function.

EXPLANATION OF REFERENCE NUMERALS
AND SYMBOLS

100: Antireflection film
10: Substrate layer
20: Coating layer

The invention claimed is:

1. An antireflection film comprising:
a substrate layer; and
a coating layer formed on at least one surface of the substrate layer,
wherein the coating layer comprises a cured material prepared from a composition containing a photo-curable (meth)acrylic acid ester resin; inorganic nanoparticles; a silicone-acrylate graft polymer including a polyacrylate main chain and a silicone side chain; and a solvent,
wherein a Newton's Ring produced after the antireflection film is pressurized on a polarizing film abates after 2 to 15 seconds after the pressure is removed.

2. The antireflection film of claim 1, wherein the silicone-acrylate graft polymer has a weight average molecular weight of 1,000 to 2,500.

3. The antireflection film of claim 1, wherein the silicone side chain is present in an amount of 10 wt % to 30 wt %, based on the total weight of the silicon-acrylate graft polymer.

4. The antireflection film of claim 1, wherein the silicone side chain of the silicone-acrylate graft polymer is present at a surface of the coating layer.

5. The antireflection film of claim 1, wherein the solvent has a polarity index of 5.0 or less.

6. The antireflection film of claim 1, wherein the solvent comprises at least one selected from the group consisting of a benzene solvent, a ketone solvent, an alcohol solvent, and a combination thereof.

7. The antireflection film of claim 1, wherein the photo-curable (meth)acrylic acid ester resin has a weight average molecular weight of 150 to 300.

8. The antireflection film of claim 1, wherein the inorganic nanoparticles have an average particle diameter of 30 nm to 60 nm.

9. The antireflection film of claim 1, wherein the inorganic nanoparticles comprise at least one selected from the group consisting of silica particles, titania particles, zirconium oxide particles, and a combination thereof.

10. The antireflection film of claim 1, wherein the inorganic nanoparticles are surface-treated with a silane-based compound.

11. The antireflection film of claim 10, wherein 10% to 50% of a total surface area of the inorganic nanoparticles is surface-treated with the silane-based compound.

12. The antireflection film of claim 10, wherein the silane-based compound comprises at least one selected from the group consisting of 3-aminopropyltriethoxysilane (AOPTMS), methacryloxypropyltrimethoxysilane (MAPTMS), 3-methacryloxypropyltrimethoxysilane, and a combination thereof.

13. The antireflection film of claim 1, wherein the composition comprises the silicone-acrylate graft polymer in an amount of 0.03 wt % to 0.1 wt %.

14. The antireflection film of claim 1, wherein the composition comprises the solvent in an amount of 50 wt % to 90 wt %.

15. The antireflection film of claim 1, wherein the cured material is formed by photo-curing the composition at a light energy of 200 mJ to 400 mJ.

16. The antireflection film of claim 1, wherein the substrate layer comprises at least one selected from the group consisting of polyethylene terephthalate, polyethylene naphthalate, polyether sulfone, polycarbonate, polypropylene, and a combination thereof.

17. The antireflection film of claim 1, wherein the substrate layer has a thickness of 25 µm to 200 µm.

18. The antireflection film of claim 1, wherein the coating layer has a thickness of 90 nm to 120 nm.

19. The antireflection film of claim 1, further comprising:
an adhesive layer formed on a surface of the substrate layer opposite that of the coating layer; and
a release film layer formed on the adhesive layer.

* * * * *